United States Patent
Arnell

(10) Patent No.: US 7,912,575 B2
(45) Date of Patent: Mar. 22, 2011

(54) CONTROL DEVICE IN FEEDING LINE

(75) Inventor: Fredrik Arnell, Olofstrom (SE)

(73) Assignee: Binar Aktiebolag (publ), Trollhättan (SE)

( * ) Notice: Subject to any disclaimer, the term of this patent is extended or adjusted under 35 U.S.C. 154(b) by 817 days.

(21) Appl. No.: 11/836,613

(22) Filed: Aug. 9, 2007

(65) Prior Publication Data

US 2009/0043420 A1    Feb. 12, 2009

(51) Int. Cl.
*G06F 7/00* (2006.01)
*G01G 13/02* (2006.01)
*G01G 19/00* (2006.01)

(52) U.S. Cl. ........ 700/228; 177/119; 177/145; 177/120; 198/474.1

(58) Field of Classification Search .................. None
See application file for complete search history.

(56) References Cited

U.S. PATENT DOCUMENTS

| | | | | |
|---|---|---|---|---|
| 3,902,609 A * | 9/1975 | Ohlsson | ...................... | 414/788.3 |
| 4,036,345 A * | 7/1977 | Webb | ........................ | 193/35 SS |
| 5,374,151 A * | 12/1994 | Matthews | ...................... | 414/392 |
| 5,760,343 A * | 6/1998 | Arimoto et al. | ............. | 177/25.18 |
| 5,997,151 A * | 12/1999 | Douglass, II | ................. | 362/239 |
| 6,019,211 A * | 2/2000 | Masciarelli, Jr. | ........... | 198/345.1 |
| 6,252,181 B1 * | 6/2001 | Fallas et al. | .................... | 177/119 |
| 6,850,464 B2 * | 2/2005 | Carlsruh et al. | ................. | 367/99 |
| 7,137,504 B2 * | 11/2006 | Ozaki et al. | .................... | 198/779 |
| 2004/0151068 A1 * | 8/2004 | Carlsruh et al. | ................. | 367/99 |
| 2005/0178036 A1 * | 8/2005 | Henick et al. | ................... | 40/617 |
| 2008/0020672 A1 * | 1/2008 | Osborn | ........................ | 446/227 |

FOREIGN PATENT DOCUMENTS

DE    43 22 963 A1    2/1995
DE    100 27 144 A1    12/2001

OTHER PUBLICATIONS

English language Abstracts of DE 43 22 963 A1 and 100 27 144 A1.

* cited by examiner

*Primary Examiner* — Gene Crawford
*Assistant Examiner* — Yolanda Cumbess
(74) *Attorney, Agent, or Firm* — Plumsea Law Group, LLC

(57) ABSTRACT

The present invention relates to a control method in the feeding of plate shaped workpieces to a work station, comprising feeding of the workpiece (8) to a control station (1) at which control station (1) it is controlled that the desired number of workpieces (8) are fed to the work station (7), whereby weighing is performed at said control station (1) by at least one electronic weighing unit (3) that transmits signals to a control unit (6) arranged to signal for the feeding of the workpiece (8) to the work station (7) when the transmitted weight signal lies within a predetermined set point range, wherein said weighing unit (3) is kept fixed on top of a fixing structure (4) and in that control takes place directly at the control station (1) before initiating moving of the workpiece (8) to the work station (7), in order to give reliable moving of a single workpiece (8) at the time in the work station (7).

20 Claims, 5 Drawing Sheets

CONTROL DEVICE IN FEEDING LINE

BACKGROUND

1. Field of the Invention

The present invention relates to a control method in the feeding of plate shaped workpieces to a work station, comprising feeding of the workpiece to a control station at which control station it is controlled that the desired number of workpieces are at the control station before moving the workpiece to the work station. The invention also relates to a control station in connection with the feeding of workpieces to a work station, comprising a receiving section, a fixing structure arranged to position/fix the receiving section and at least one detecting means in communication with a control unit and arranged to detect the number of workpieces on top of the receiving section.

2. Prior Art

Automated production lines have been well known for long. In some production lines, such as pressing lines for the production of details of shaped plate, for example in the production of body details in motor-car production, there is a particular problem in connection with automated feeding. In the following, said problem will be described in connection with such a pressing line, but it is realized that the invention is not limited to the use of such pressing lines. A pressing line consists of a plurality of different pressing stations into which a predetermined plate detail is introduced at one end and is then successively pressed to the desired shape in the different presses in the pressing line. It is of great importance for the profitability of such production that the machine availability is high at the machines and that the processing time is as short as possible. One occurring cause of stoppage in such a pressing line is that more than one plate is accidentally fed into the pressing line, so called double feeding. Double feeding of plates will namely result in problems since the pressing line is designed/dimensioned to handle a single plate at the time. The consequences of double feeding can be that one or in worst case a plurality of the presses and/or the tools in the line break(s) down. In either case, such double feeding most often results in non desired stoppage.

With the purpose of eliminating double feeding, there is a control station at the feeding station for a pressing line, the object of which is to eliminate double feeding. Traditionally, such a control station has been manned for the performing of said control and to make sure that not more than a single plate is feed into the line at the time. For several reasons, such as economical reasons, there is however a strive to eliminate manning at a control station. Accordingly, there is today many types of known arrangements to achieve automated control. The most common arrangements make use of either inductive sensors and/or optical sensors. Another type of principle arrangement to avoid double weighing is known from DE 4322963 and DE 10027144. This known principle uses lifting mechanisms with suction cups and the weighing is performed in connection with the lifting/moving. Such known arrangements will however not work completely satisfactory in all situations and are relatively expensive.

SUMMARY OF THE INVENTION

It is an object of the present invention to eliminate, or at least minimize, the above mentioned problem, which is achieved by a method according to claim 1 and a control station according to claim 8, respectively.

Thanks to the invention a very reliable and cost efficient method is achieved in order to eliminate the risk that more than one workpiece at the time is fed into a production line, such as a pressing line in connection with the production of car body details.

According to further aspects of the invention:

said weighing unit comprises at least one electronic load cell, preferably a plurality of horizontally distributed, electronic load cells, which constitutes a cost efficient solution that is easy to service.

said control unit is provided with software intended reliably to be able to calculate the weight of a workpiece based on the weight signal given by the weighing unit, which contributes to the ability to find cost efficient and flexible/customized solutions for many different situations the weighing unit is arranged between a fixing structure and a receiving section intended to receive the workpiece, which gives advantages in the form of the ability to use a modular construction.

there is arranged, between the weighing unit and the receiving section, a first interface that is fixed to the weighing unit and arranged to be able to be interconnected with a second interface arranged at the receiving section, which will additionally increase flexibility.

said first interface is provided with a plurality of sets of interconnecting means arranged to enable interconnecting with different types of receiving sections, which constitutes a particularly cost efficient solution in order to achieve good flexibility.

the control station is used to give reliable moving of a single workpiece at the time, to the workstation.

BRIEF DESCRIPTION OF THE DRAWINGS

In the following, the invention will be described in greater detail with reference to the attached figures, of which.

DETAILED DESCRIPTION OF THE INVENTION

Figure 1:
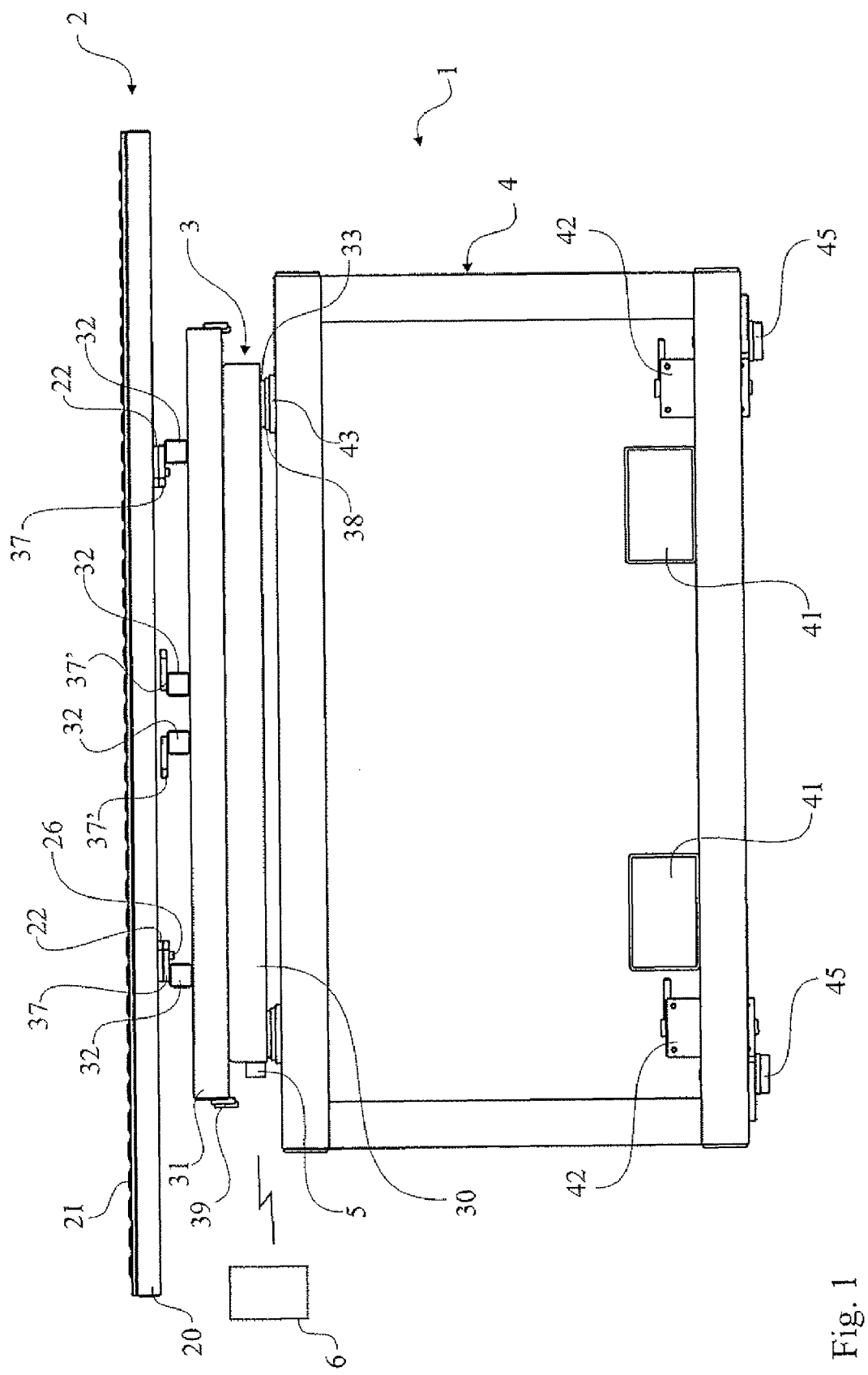
FIG. 1 shows a preferred embodiment of a control station according to the invention, as seen from the long side.
Figure 2:
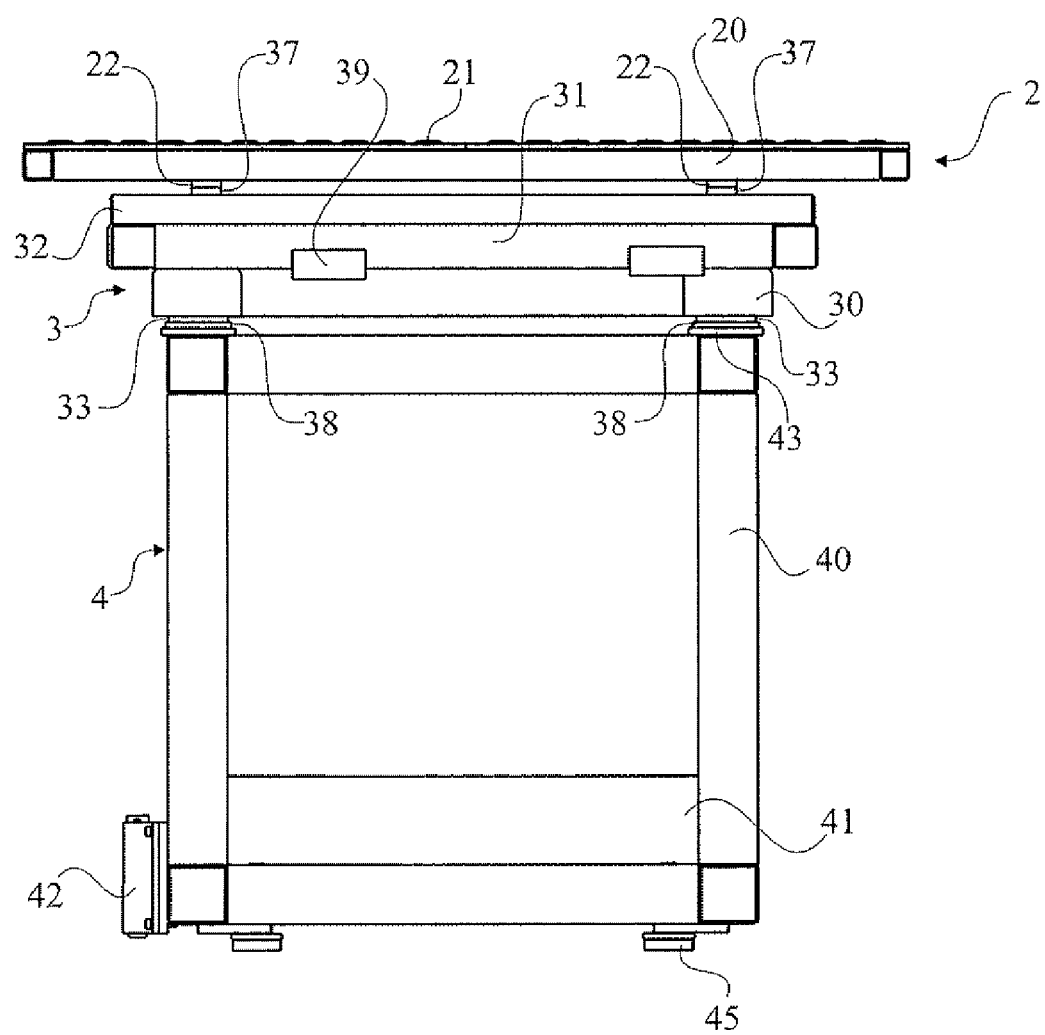
FIG. 2 shows a view from the short side.
Figure 3:
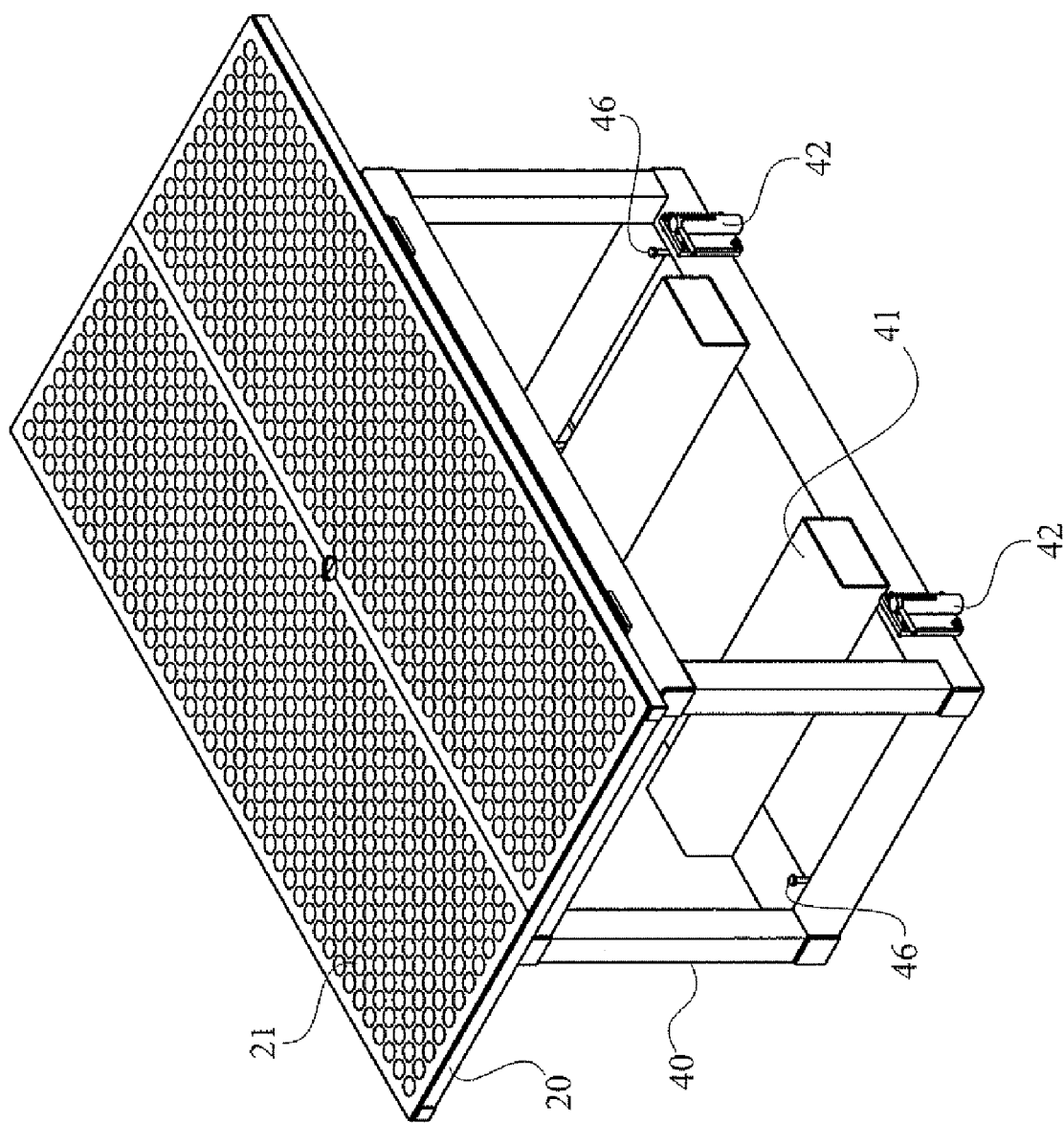
FIG. 3 shows a view in perspective as seen obliquely from above.

FIGS. 1, 2 and 3 show a preferred embodiment of a control station 1 according to the invention, which consists principally of a receiving section 2, a weighing section 3, a fixing stand 4 and an interface unit 5.

In the shown embodiment, the receiving section 2 consists of a horizontal frame structure 20 on top of which there is arranged a surface 21 of rolling balls as is known per se, in order easily to move an object over the surface 21. First fasteners 22 are fixed in the bottom section of the frame 20.

The weighing section 3 comprises a weighing unit 30 comprising four load cells 33. A frame 31 is fixed on top of the weighing unit. A number of lateral spacing tubes 32 are fixed on top of the frame 31, at which spacing tubes a first set of second fasteners 37 and a second set of second fasteners 37', 39 are arranged. This plurality of second fasteners 37, 37', 39 will enable exchanging of the receiving section 2, such that it is easy to achieve different types of functionalities of the receiving section by changing it e.g. from a surface of rolling balls to a conveyor belt (not shown), that require different types of attachment for reliable fixing.

The fixing structure 4 consists of a frame structure 40 intended to carry the weighing unit 3 and the receiving section 2. At the lower part of the frame 40, fixing means 42, 43 are arranged and intended to be easily maneuvered in order to fix the frame 40 by positioning bars 43, at a desired position on the floor, such that it will reliably maintain its position during production. The weight of the station 1 is carried by feet 45 positioned in the vicinity of the respective corners. It is furthermore shown that lateral, open box girders 41 are arranged at the bottom part of the frame 40, which box girders 41 are intended for the unit 1 to easily be lifted and moved by a fork-lift truck. Base plates 43 are arranged at the top of the frame 40 and are aligned with the load cells 33 (in the figure, the load cells are only schematically shown, as these are details that are well known to the person skilled in the art). The end that projects from the load cell 33 rests on a vibration damping insert 38 via which the force is transmitted down to the base plate 43 and further through the frame 40.

Detail 5 schematically shows an interface unit arranged at the weighing unit 3. The interface unit 5 receives the signals given by the load cells 33 and transmits them to a control unit 6 with control logic. The shown case uses wireless communication but communication with wire is of course also conceivable. In the shown case the control logic is such that it eliminates the possibility of feeding double workpieces 8 to the first unit 7 of the working line.

Figure 4:
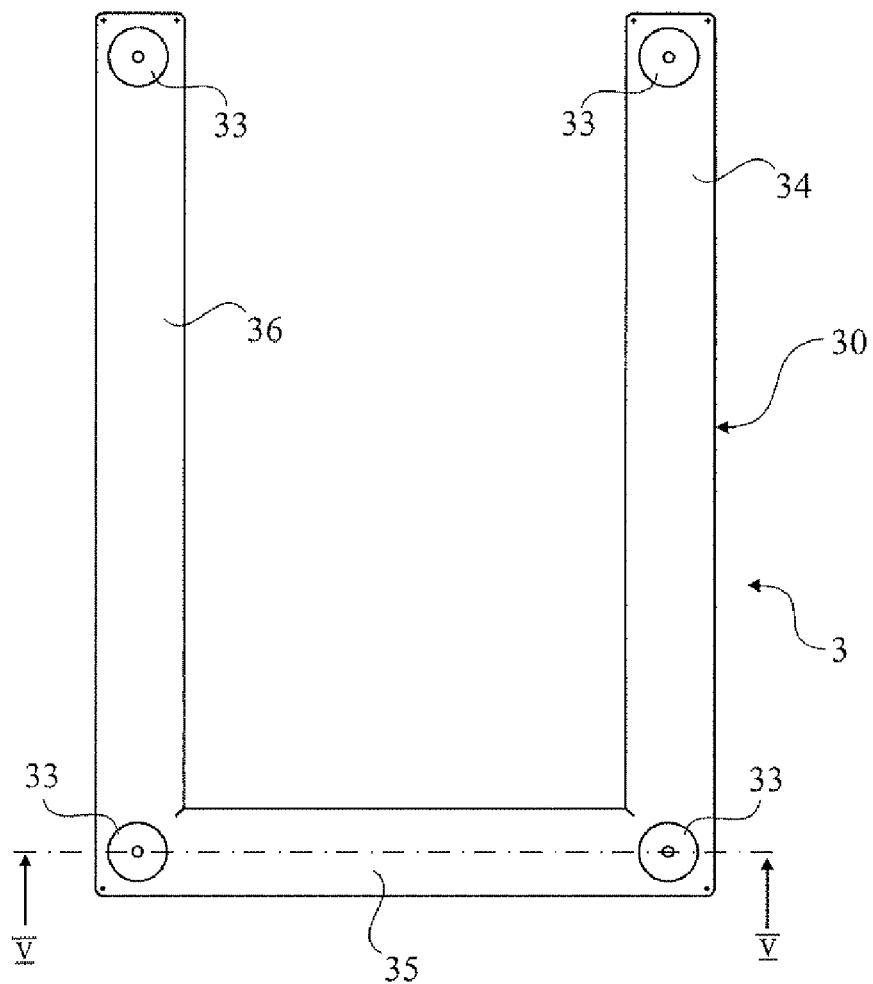
FIG. 4 shows a weighing unit according to a specific embodiment, comprised in a control station according to the invention.
Figure 5:
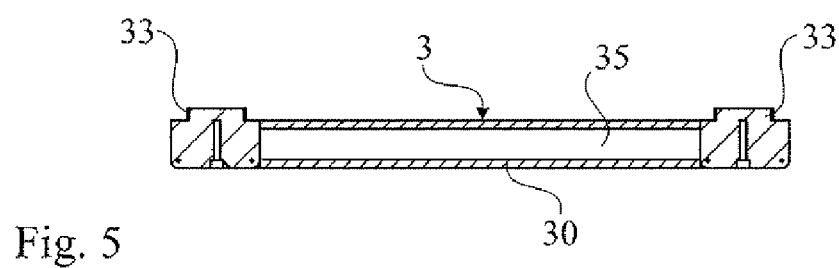
FIG. 5 shows section V-V in FIG. 4.
Figure 6:
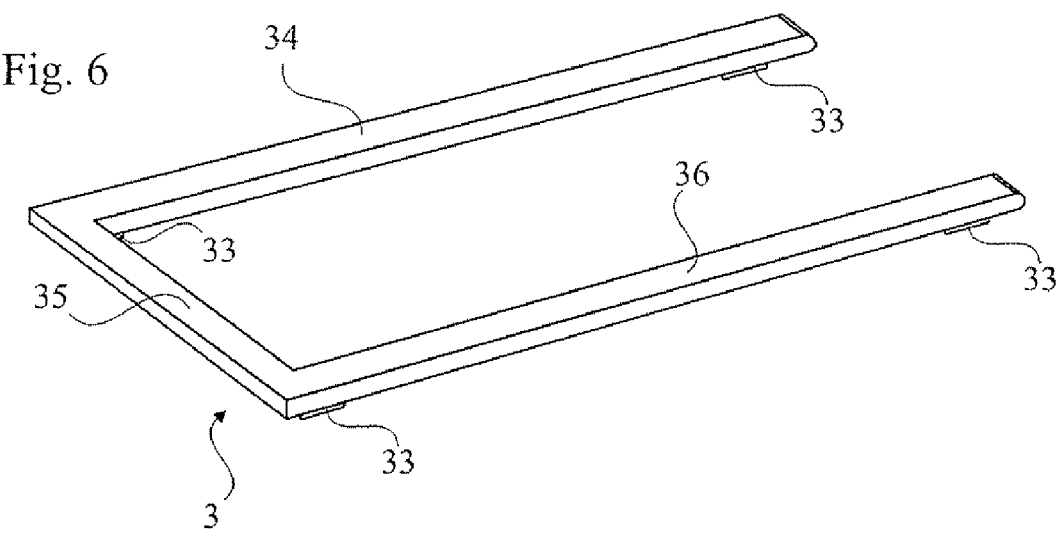
FIG. 6 shows the weighing unit as seen in a perspective view obliquely from above.

FIGS. 4, 5 and 6 show that a (standard) weighing 30 that exists on the market today, i.e. intended for other purposes as well, can be used, in this specific case consisting of three integrated beams 34, 35, 36 that form a U and load cells 33 arranged in the vicinity of each corner/end. Accordingly, four load cells 33 are arranged to determine the weight of an object 8 positioned on the receiving section 2. It is realized that the use of a standard/on the market existing weighing unit 30 results in several advantages, among other the utilization of a well-tried product, large series that result in cost benefits, large supplies etc., especially in combination with a control station according to a preferred embodiment according to the invention that also for the rest utilizes standard products in the receiving section as well as in the fixing structure, which means that a control station can be manufactured at an extremely low cost as compared to other alternatives known today.

Figure 7:
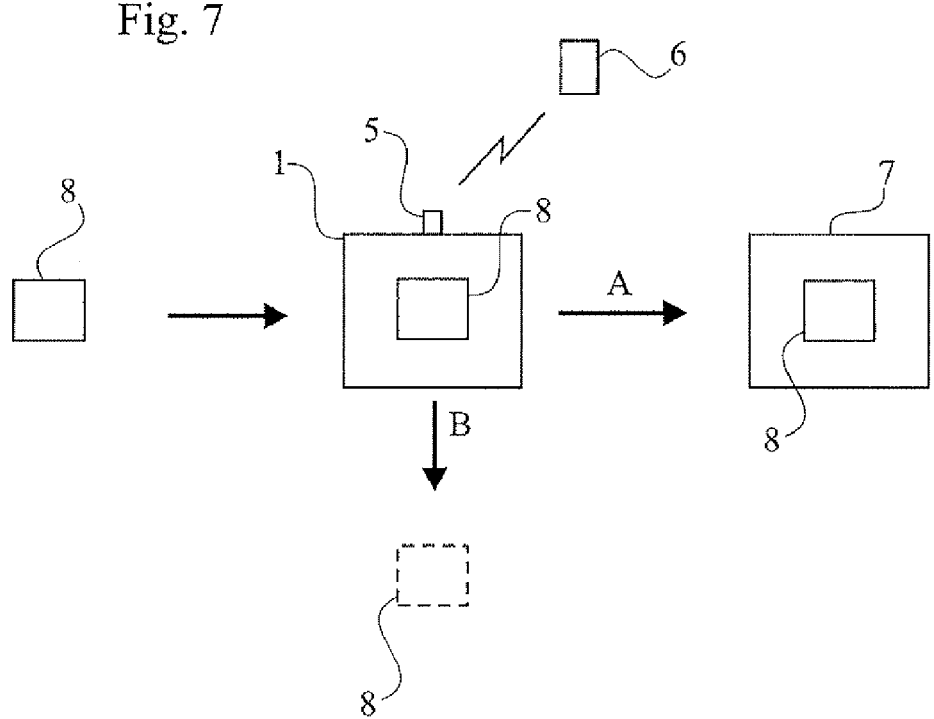
FIG. 7 is a flowchart that shows the principles according to the invention.

FIG. 7 shows the principles for the utilization of a control station according to the invention. It is shown that in a first stage a workpiece 8 is transported (in a suitable/desired way, such as by a picking robot, a travelling crane etc.) and is positioned on top of the surface 21 in the receiving section 2. In that connection, signals are given via the weighing unit 30 and its load cells 33, which signals indicate the weight of the workpiece 8 and are transmitted via the interface unit 5 to the control unit 6 where software calculates the weight of the workpiece 8 and checks if it is within a predetermined set point range. Naturally, the construction suitably allows for weight determination also outside the set point range. If for example the set point range is determined to 1.0-1.2 (normal weight about 1.1 kg), it is advantageous for the equipment to be able to register the weight within a neighboring range of boundaries, e.g. at least 0.5-2.5 kg, such that the weight can be determined also in case of a "double plate delivery". More preferably, the construction allows for such weight determination within a wide range such as 0.1-100 kg, in order to be able to be adapted to principally all types of handling that may occur in such a working line, i.e. the handling of small plates of small thicknesses as well as large objects of large thicknesses. If the control unit 6 registers that the predetermined set point range is fulfilled, the workpiece 8 will be fed along a path A that leads to a first machine 7 in the working line. If on the other hand a weight is registered for the workpiece 8 outside the determined set point range, the workpiece 8 will instead be fed along another path B such that is does not enter the production line.

The invention is not limited to what has been described above but may be used within the scope of the following claims. As already indicated, a plurality of different types of receiving sections 2 can be used and hence it is realized that this flexible property of a control station according to the invention can be used within wide boundaries. It is also realized that many different types of fastening principles can be used in order to fix/lock a receiving section 2 to the weighing unit 3. Similarly, it is realized that the arrangement of the weighing unit 3 at the fixing unit 4 can take place in many different ways, according to well known principles for the arrangement of a load bearing platform on top of a fixing structure. It is also realized that the number of load cells 33 can be varied within wide boundaries without departing from the principles according to the invention. Accordingly, there may be used anything from one load cell to a plurality of load cells depending on desire and specific requirements. It is furthermore realized that also the fixing structure 40 can be made in many different types of configurations and that the shown example is but one of many options, however also showing the possibility of achieving a very cost efficient production (easy manufacturing, non-expensive details).

What is claimed is:

1. A method for controlling feeding of plate-shaped workpieces to a work station comprising:
   feeding a plate-shaped workpiece to a control station;
   fixing at least one electronic weighing unit in a stationary position on a fixing structure of the control station, wherein the at least one electronic weighing unit comprises four electronic load cells, each disposed proximate to a corner of a U-shaped structure formed from three connected straight beams;
   weighing the workpiece at the control station using the at least one electronic weighing unit of the control station;
   transmitting, from the at least one electronic weighing unit, a weight signal to a control unit; and
   signaling, by the control station, for the feeding of the workpiece to the work station only if the transmitted weight signal lies within a predetermined set point range corresponding to a single unit of the workpiece,
   wherein weighing the workpiece, transmitting the weight signal, and signaling for the feeding occur at the control station before initiating moving of the workpiece from the control station to the work station.

2. The method according to claim 1, further comprising damping vibrations of the control station using a vibration damping insert at each of the four electronic load cells.

3. The method according to claim 1, wherein feeding the workpiece to the control station comprises picking up the workpiece and placing the workpiece on the control station.

4. The method according to claim 3, wherein feeding the workpiece comprises automatically picking up and placing the workpiece.

5. The method according to claim 1, further comprising providing the control unit with software configured to calculate a weight of the workpiece based on the weight signal transmitted by the at least one electronic weighing unit.

6. The method according to claim 1, further comprising fixing the at least one electronic weighing unit between the fixing structure and a receiving section of the control station, wherein the receiving section is configured to receive the workpiece.

7. The method according to claim 6, further comprising:
fixing a first interface between the at least one electronic weighing unit and the receiving section; and
disposing a second interface at the receiving section, wherein the first interface is interconnected with the second interface.

8. The method according to claim 7, further comprising providing the first interface with a plurality of sets of interconnecting means configured to enable interconnecting with different types of receiving sections.

9. The method according to claim 6, wherein the receiving section comprises a surface of rolling balls.

10. The method according to claim 1, further comprising securing the fixing structure to a floor such that the fixing structure maintains a stationary position during production.

11. A control station for controlling feeding of plate-shaped workpieces to a work station comprising:
a fixing structure;
a receiving section fixed in a stationary position on the fixing structure and having a surface of rolling balls;
at least one electronic load cell disposed at the receiving section; and
a control unit in communication with the at least one electronic load cell,
wherein the at least one electronic load cell and the control unit are configured to determine a quantity of plate-shaped workpieces present at the receiving section, and
wherein the at least one electronic load cell comprises four electronic load cells, each disposed proximate to a corner of a U-shaped structure formed from three connected straight beams.

12. The control station according to claim 11, wherein the at least one electronic load cell is disposed in a weighing unit that is disposed between the receiving section and the fixing structure.

13. The control station according to claim 11, further comprising a vibration damping insert disposed at each of the four electronic load cells.

14. The control station according to claim 11, further comprising:
a weighing unit comprising the at least one electronic load cell;
a first interface in contact with the weighing unit; and
a second interface interconnected with the first interface and in contact with the receiving section.

15. The control station according to claim 14, further comprising fasteners interconnecting the first interface to the second interface, wherein the fasteners are configured to enable interconnecting with different types of receiving sections.

16. The control station according to claim 11, wherein the fixing structure includes a base plate at each of the four electronic load cells, wherein each base plate is aligned with its respective electronic load cell, and wherein a vibration damping insert is disposed between each electronic load cell and base plate.

17. The control station according to claim 11, wherein the fixing structure comprises:
a frame structure having an upper portion and a lower portion;
at least one base plate on the upper portion of the frame structure, wherein each base plate is disposed in between each of the at least one electronic load cell and the upper portion of the frame structure;
at least one positioning bar on the lower portion of the frame structure, wherein each of the positioning bars is configured to releasably engage a floor; and
a girder on the lower portion of the frame structure, wherein the girder is configured to receive a fork of a fork-lift truck.

18. The control station according to claim 11, wherein the fixing structure comprises a girder configured to receive a fork of a fork-lift truck.

19. The control station according to claim 11, wherein the control station is discontinuous with a preceding workpiece storage station and the subsequent work station, such that a workpiece is transported to and from the control station by picking up and placing the workpiece.

20. The control station according to claim 11, wherein the fixing structure is secured to a floor such that the fixing structure maintains a stationary position during production.

* * * * *